No. 897,689. PATENTED SEPT. 1, 1908.
C. WALTHER.
RAKE.
APPLICATION FILED DEC. 24, 1907.

3 SHEETS—SHEET 1.

WITNESSES:

INVENTOR
C. Walther
BY
W. J. FitzGerald &Co.
Attorneys

No. 897,689. PATENTED SEPT. 1, 1908.
C. WALTHER.
RAKE.
APPLICATION FILED DEC. 24, 1907.
3 SHEETS—SHEET 2.
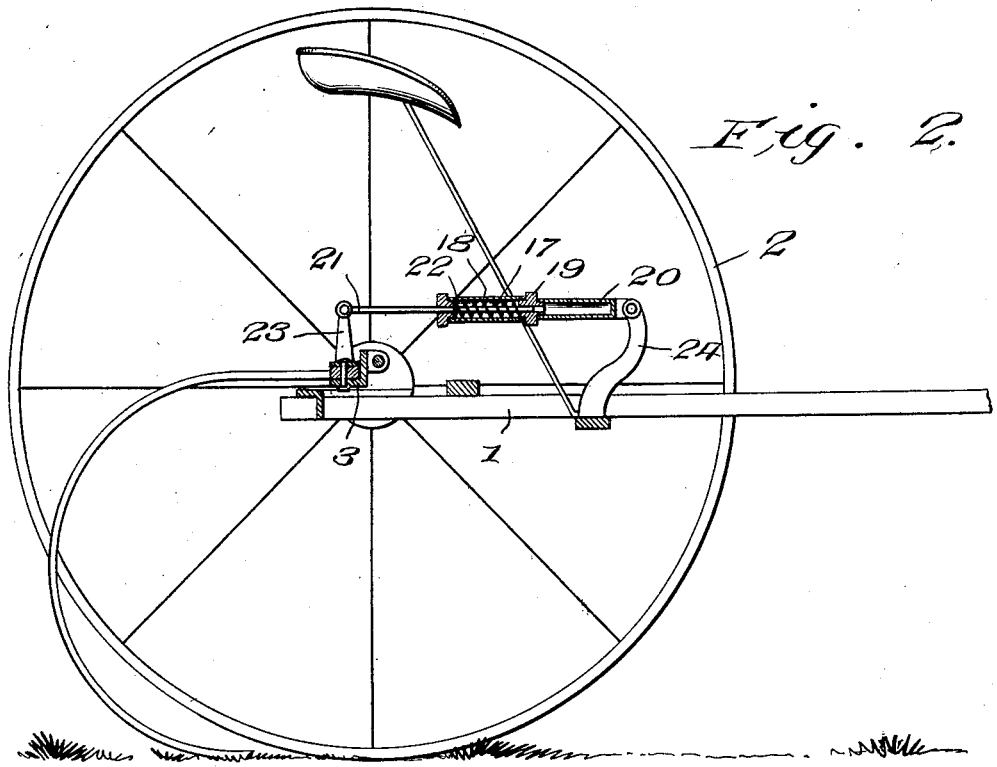
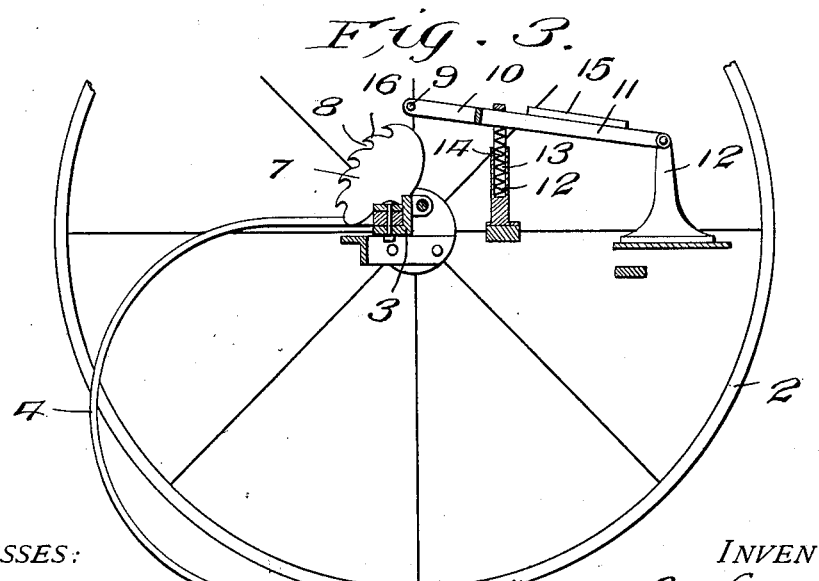
WITNESSES:
INVENTOR
C. Walther
BY
W. J. FitzGerald
Attorneys No. 897,689. PATENTED SEPT. 1, 1908.
C. WALTHER.
RAKE.
APPLICATION FILED DEC. 24, 1907.

3 SHEETS—SHEET 3.

WITNESSES:
Thos. W. Riley
Earle L. Keeler.

INVENTOR
C. Walther
BY
W.T. FitzGerald & Co
Attorneys

UNITED STATES PATENT OFFICE.

CLARENCE WALTHER, OF OAKDALE, CALIFORNIA.

RAKE.

No. 897,689.  Specification of Letters Patent.  Patented Sept. 1, 1908.

Application filed December 24, 1907. Serial No. 407,937.

*To all whom it may concern:*

Be it known that I, CLARENCE WALTHER, a citizen of the United States, residing at Oakdale, in the county of Stanislaus and State of California, have invented certain new and useful Improvements in Rakes; and I do hereby declare the following to be a full, clear, and exact description of the invention, such as will enable others skilled in the art to which it appertains to make and use the same.

My invention relates to new and useful improvements in rakes and more particularly to dump rakes employed for gathering grass, or the like, and depositing the same in bunches or wind rows and my object is to provide means for holding the teeth in their elevated position until such time as it is desired to lower the same.

A further object is to provide means for disposing the holding parts into engagement with each other or releasing the same, and a still further object is to provide means for normally holding the teeth in their lowered positions and reducing the jar coincident to lowering the same to a minimum.

Other objects and advantages will be hereinafter referred to and more particularly pointed out in the claims.

Figure 1:
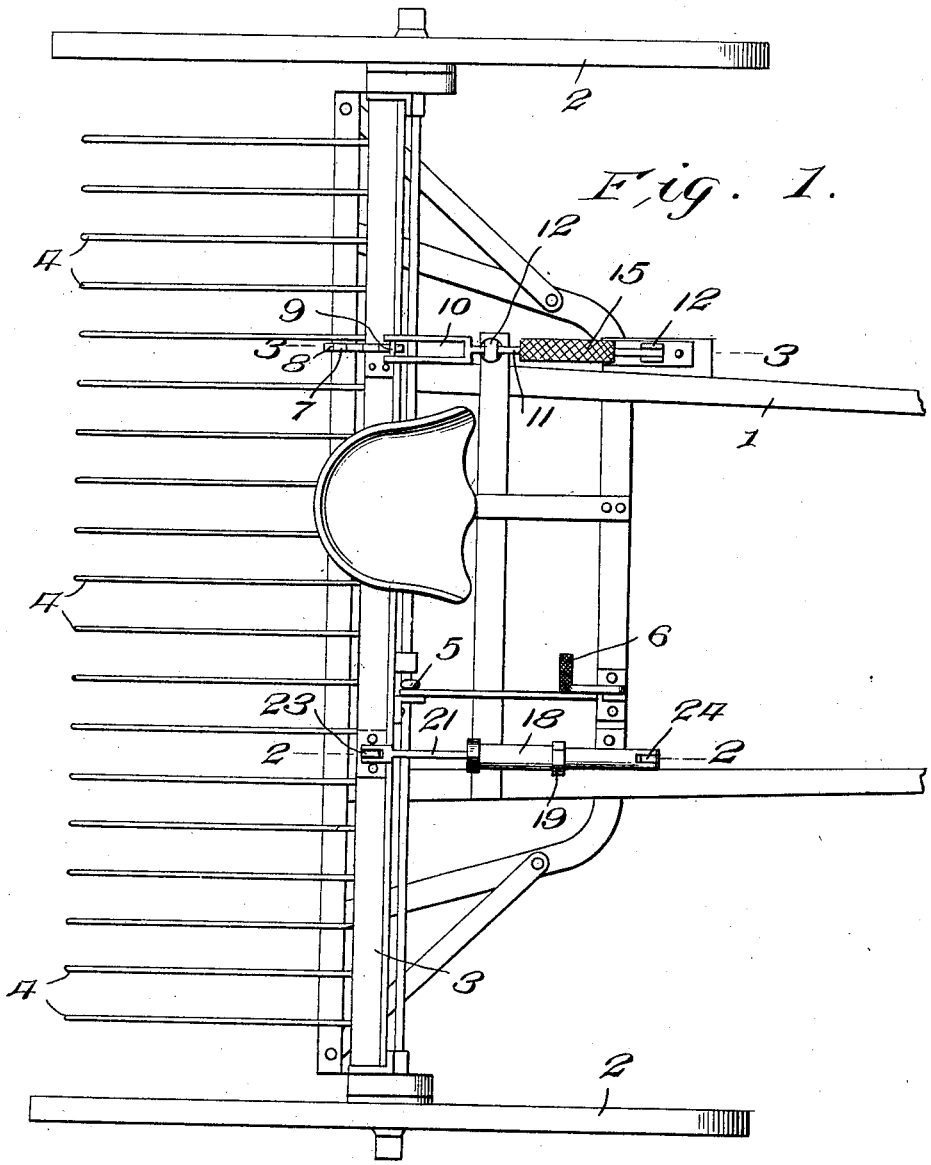
Figure 4:
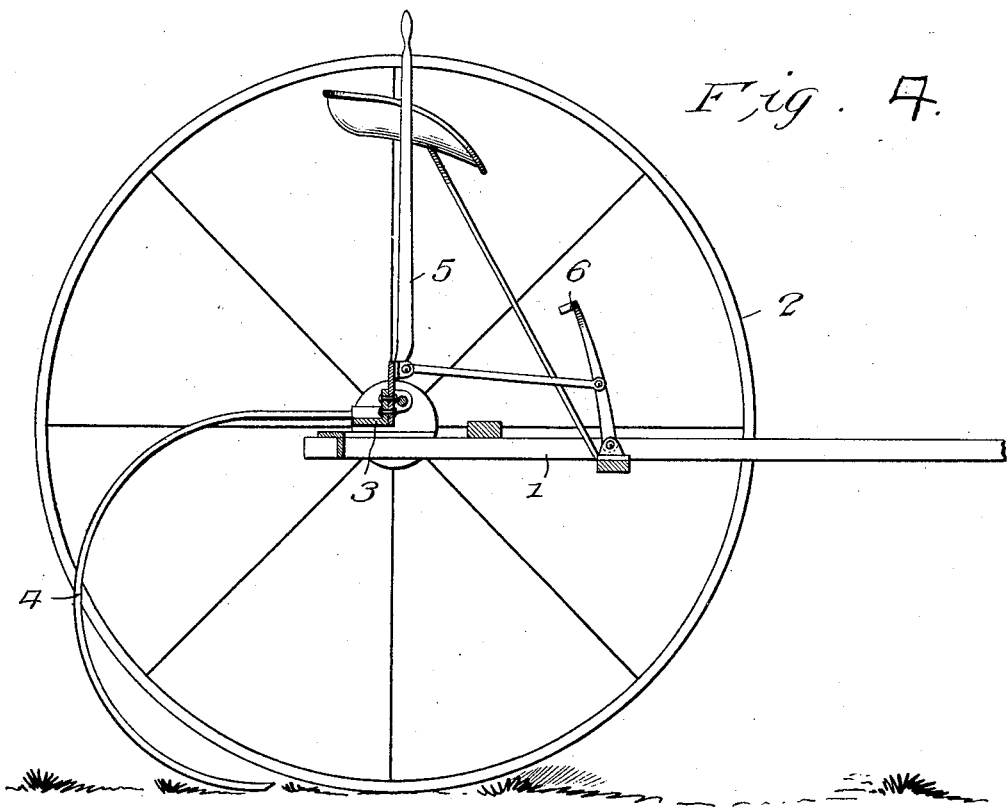

In the accompanying drawings which are made a part of this application, Figure 1 is a top plan view of a rake, showing my improved attachments secured thereto. Fig. 2 is a sectional view thereof as seen on line 2—2, Fig. 1. Fig. 3 is a sectional view as seen on line 3—3, Fig. 1, and Fig. 4 is a cross section of the rake showing the dumping mechanism for operating the same.

Referring to the drawings in which similar reference numerals designate corresponding parts throughout the several views, 1 indicates the frame of the rake, which is constructed in the usual or any preferred manner and is provided at each end with supporting wheels 2.

Pivotally mounted above the frame 1 is a rake bar 3, to which is secured a plurality of rake teeth 4, said teeth being curved in the usual manner and adapted to engage the grass when the teeth are in their lowered position and after a requisite amount of the grass has been gathered by the teeth, said teeth are elevated by rotating the rake bar 3 through the medium of the usual form of lever 5, provided for that purpose, or by depressing a foot lever 6 and, heretofore, it has been necessary to hold the rake teeth in their elevated position by grasping the lever 5 and exerting manual pressure thereon, thus leaving but one hand of the operator free with which to guide the draft animals, and to overcome this objectionable feature I have provided my automatic means for holding the teeth in their elevated position until such time as it is desired to lower the teeth. To this end I have provided a rack 7, the edge of which is provided with a plurality of notches 8, with which is adapted to engage a pin 9, carried in the bifurcated end 10 of a locking bar 11, which bar is pivotally secured to a standard 12 on the frame 1. The bifurcated end of the locking bar 11 is normally held out of engagement and in alinement with the rack 7 by extending the locking bar through a stirrup 12, the body of the stirrup being provided with a socket 13, in which is secured a spring 14, the upper end of the spring engaging the lower face of the locking bar 11 and normally holding the same in engagement with the upper end of the stirrup and the pin 9 above the path of the rack 7, but when the teeth 4 are elevated, downward pressure is directed on the locking bar 11 by placing the foot on a plate 15 secured to the locking bar for that purpose, the pin 9 descending and engaging one of the notches in the rack bar and, as the teeth 16, forming the notches 8, are slightly curved downwardly at their outer ends, the pin 9 will be positively held in the notches by the weight of the rake teeth.

When it is desired to lower the rake teeth, the lever 5 is moved forwardly a sufficient distance to release the pin 9 from the notch with which it is engaged, whereupon the spring 14 will elevate the free end of the locking lever and allow the teeth to descend.

The teeth 4 are normally held in their lowered position by means of a spring 17, which spring is mounted in a casing 18, each end of the casing having a head 19, through which extend bores 20.

Slidably mounted in the bores 20 and extending through the spring 17 and beyond one end of the casing is a rod 21, said rod having a collar 22 fixed thereon and on that portion of the rod surrounded by the casing, the collar normally resting adjacent one end of the casing, so that when inward pressure is directed on said rod, the spring 17 will be compressed between the collar and head 19 farthest from the collar. The end of the rod extending beyond the end of the casing, is pivotally secured to a standard 23 on the rake bar 3, while the opposite end of the casing 18 is pivotally secured to a similar standard 24 on the frame 1. By this construction it will be readily seen that when the rake bar 3 is swung on its pivot, the spring 17 will be compressed in the housing 18 until the standard 23 has passed beyond the center of gravity, when the spring will direct downward pressure on the rod 21 and the tension of the spring assist in holding the rake teeth in their elevated position and it will further be seen that when the teeth are in their lowered position, the spring 17 will direct outward pressure on the rod 21 and normally hold the teeth in their lowered position. The tension of the spring 17 is also employed for breaking the jar coincident to the lowering of the rake teeth, in that the tension of the spring when the upper end of the standard 23 is being moved towards the center of gravity, will prevent a sudden descension of the rake teeth, so that by the time the end of the standard has passed the center of gravity, the teeth will have but a short distance further to descend.

It will thus be seen that I have provided a very cheap and economical means for holding the rake teeth in their elevated position until such time as it is desired to lower the same and it will further be seen that I have provided means for normally holding the teeth in their lowered position and for lessening the jar coincident to the lowering of the teeth and it will likewise be seen that said devices may be readily attached to any suitable form or make of dump rake and at a minimum cost. It will also be readily apparent that by providing a plurality of the notches in the rack, said teeth may be supported at various heights.

What I claim is:

1. The herein described attachment for rakes, comprising the combination with a frame, a rake bar pivotally mounted on the frame, teeth carried by said bar and means to raise said teeth; of a rack secured to said rake bar, teeth on the edge of said rack to form notches and means on said frame adapted to be moved into said notches and hold the rake teeth in their elevated position.

2. The herein described attachment for rakes, comprising the combination with a frame, a rake bar pivotally mounted on said frame, teeth secured to said bar and means to swing said bar and elevate the teeth; of a rack carried by the rake bar, a plurality of teeth on the edge of said rack to form notches, a locking bar pivotally mounted on said frame, a pin carried by said locking bar adapted to be moved into engagement with the notches on the rack and means to normally hold the locking bar out of engagement with said notches.

3. The herein described attachment for rakes, comprising the combination with a pivotally mounted rake bar and teeth secured thereto; of a rack fixed to the rake bar, a plurality of teeth on said rack to form notches, the outer ends of said teeth being curved, a locking bar, a supporting standard for said locking bar, said locking bar having a bifurcated end, a pin carried by said bifurcated end adapted to engage the notches in the rack, a stirrup between the standard and bifurcated end of the locking bar and a spring carried by the stirrup adapted to direct upward pressure on the locking bar and normally hold the pin out of engagement with the notches.

4. The herein described attachment for rakes, comprising the combination with a frame, a rake bar pivotally mounted on said frame, teeth carried by the rake bar, a rod pivotally secured to said rake bar, a casing pivotally secured to said frame through which the free end of said rod extends and a spring in said casing adapted to direct outward pressure on the rod and normally hold the teeth in their lowered position; of a rack on the rake bar, teeth on said rack forming notches, a locking bar pivotally secured to said frame and having a bifurcated end, a pin carried by said bifurcated end adapted to engage the notches on the rack, a stirrup through which said locking bar extends and a spring adapted to normally hold the bifurcated end of the locking bar out of engagement with the rack.

In testimony whereof I have signed my name to this specification in the presence of two subscribing witnesses.

CLARENCE WALTHER.

Witnesses:
ALICE WALTHER,
GEO. SWATZEL.